Oct. 28, 1930.　　　J. L. BAYER　　　1,779,527
CROSS SLIDE CARRIAGE FOR MACHINE TOOLS
Filed Aug. 2, 1928　　4 Sheets-Sheet 1

INVENTOR
Julius L. Bayer.
BY
Rivers Hudson & Kent,
ATTORNEYS

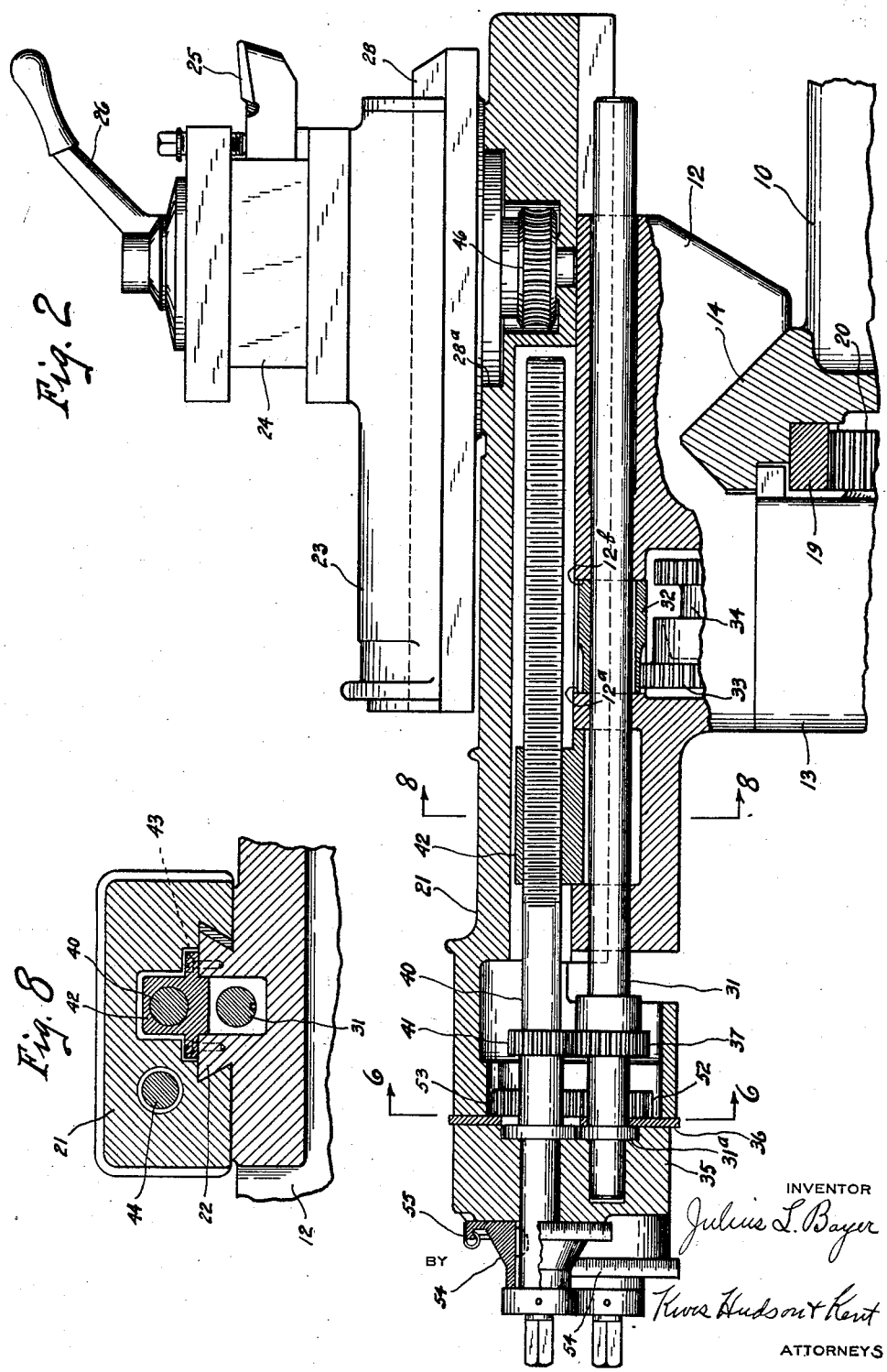

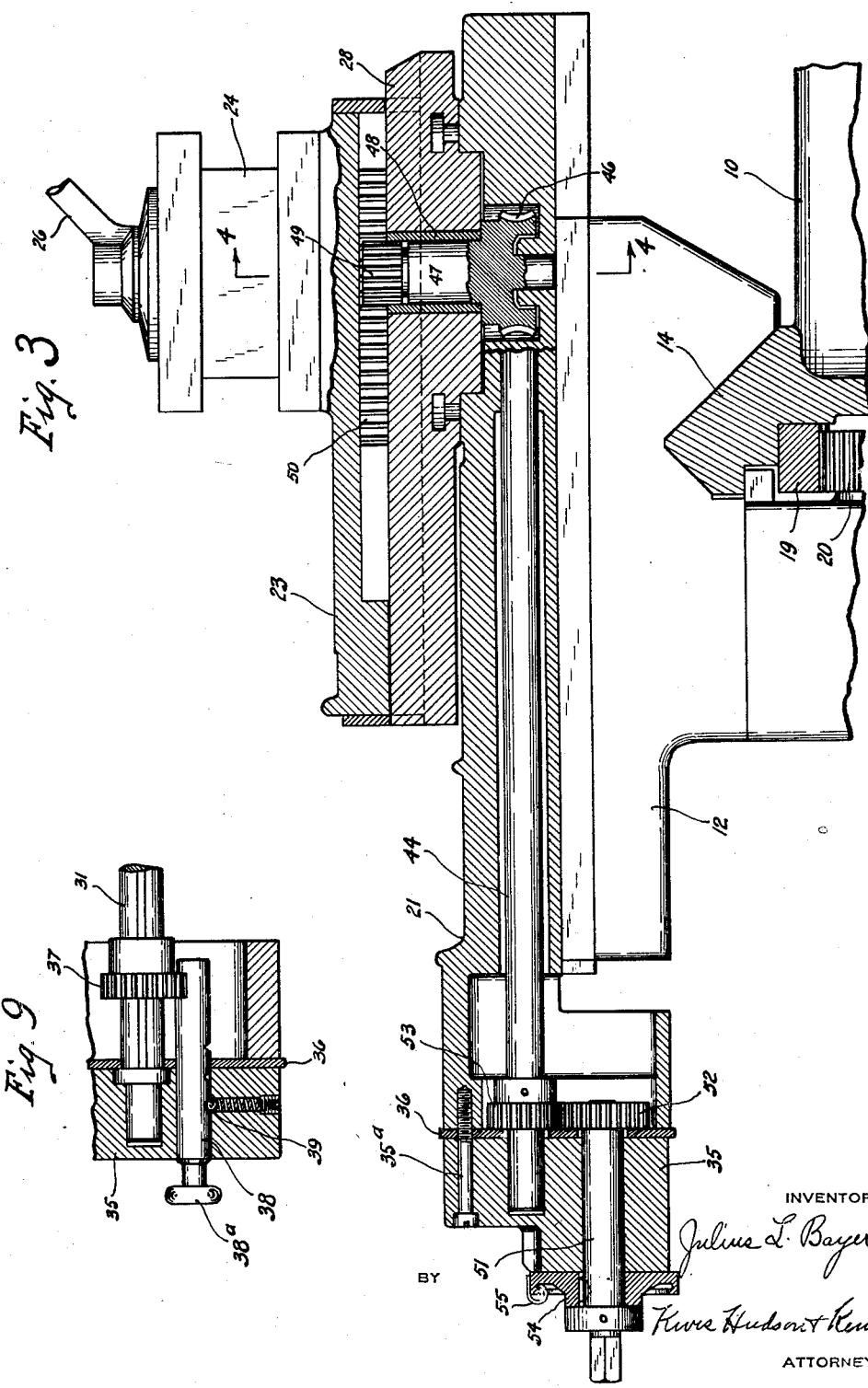

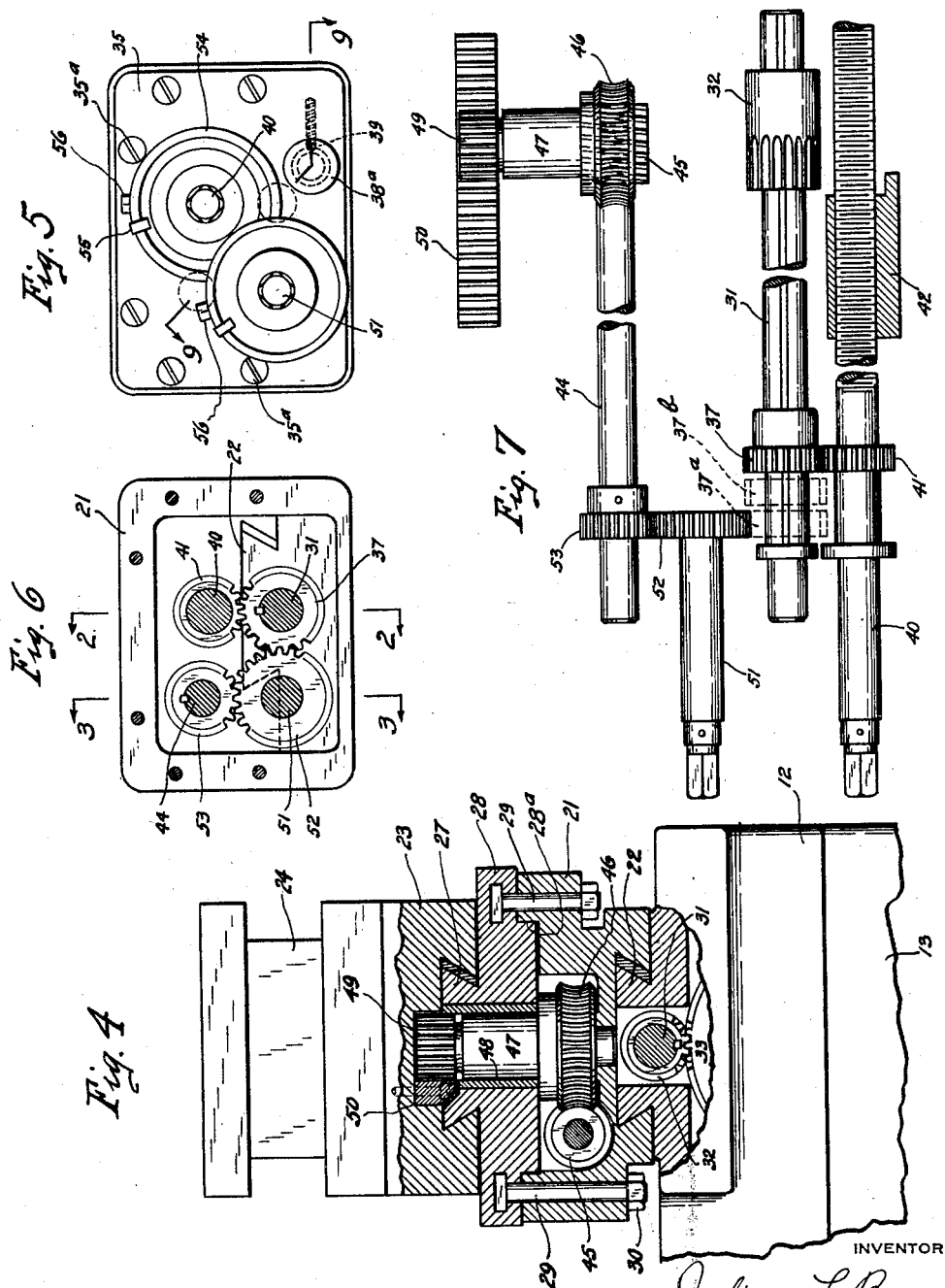

Patented Oct. 28, 1930

1,779,527

UNITED STATES PATENT OFFICE

JULIUS L. BAYER, OF CLEVELAND, OHIO, ASSIGNOR TO THE WARNER & SWASEY COMPANY, OF CLEVELAND, OHIO, A CORPORATION OF OHIO

CROSS-SLIDE CARRIAGE FOR MACHINE TOOLS

Application filed August 2, 1928. Serial No. 296,932.

This invention relates to a cross-slide carriage for machine tools, such as lathes, and has particular reference to a cross-slide carriage having on the cross-slide a tool supporting slide of the compound or universal type capable of being positioned to slide at any desired angle with reference to the axis of the machine.

One of the objects of the present invention is to provide a mechanism for operating the cross-slide and the upper or compound slide, which mechanism is adaptable for use on a carriage of standard construction and employing the usual apron gearing and normally receiving or accommodating a single slide which is a cross-slide. That is to say, it is one of the objects to provide the combination of a cross-slide carriage with its cross-slide and upper tool supporting or compound slide and mechanism for actuating these slides such that the same carriage and apron may be employed without any change in their construction whether the carriage supports a single slide or two slides.

A further object is to provide a rugged, simplified but highly efficient mechanism for operating the two slides.

A still further object is to provide an operating mechanism for the two slides, by which both slides may be either power operated or manually operated, with the manual operating means for both slides carried at the front of the cross-slide in convenient position to be manipulated while the operator is observing the work piece being machined, and with the control for changing from power feed to manual feed or vice versa also on the cross-slide adjacent the parts which are manipulated for the manual feed of the two slides.

The above and other objects are attained by this invention, which may be here briefly summarized as consisting in certain novel combinations and arrangements of parts which will be described in the specification and set forth in the appended claims.

In the accompanying sheets of drawings wherein I have shown the preferred construction and one which operates very effectively, Figure 1 is a front view of a portion of a machine tool, in this instance a lathe, portions of the head and rear end of the bed being omitted.

Figure 2 is a vertical sectional view on an enlarged scale, substantially along the line 2—2 of Figure 1, and of Fig. 6, portions being shown in elevation.

Figure 3 is a similar view substantially along the line 3—3 of Figure 1 and of Fig. 6, portions being shown in elevation.

Figure 4 is a partial elevation and a partial section substantially along the line 4—4 of Fig. 3, the section being taken at right angles to the sections of Figures 2 and 3.

Figure 5 is an end view of the cross-slide looking toward the right of Figures 2 or 3.

Figures 6 is a transverse sectional view through the outer portion of the cross-slide substantially along the line 6—6 of Figure 2.

Figure 7 is a diagrammatic view showing the operating mechanism for the two slides, the parts being detached from their supporting members with some being displaced from their actual relative positions to more clearly show the mechanism.

Figure 8 is a transverse sectional view substantially along the line 8—8 of Figure 2.

Figure 9 is a fragmentary sectional view substantially along the irregular line 9—9 of Figure 5.

Figure 1:
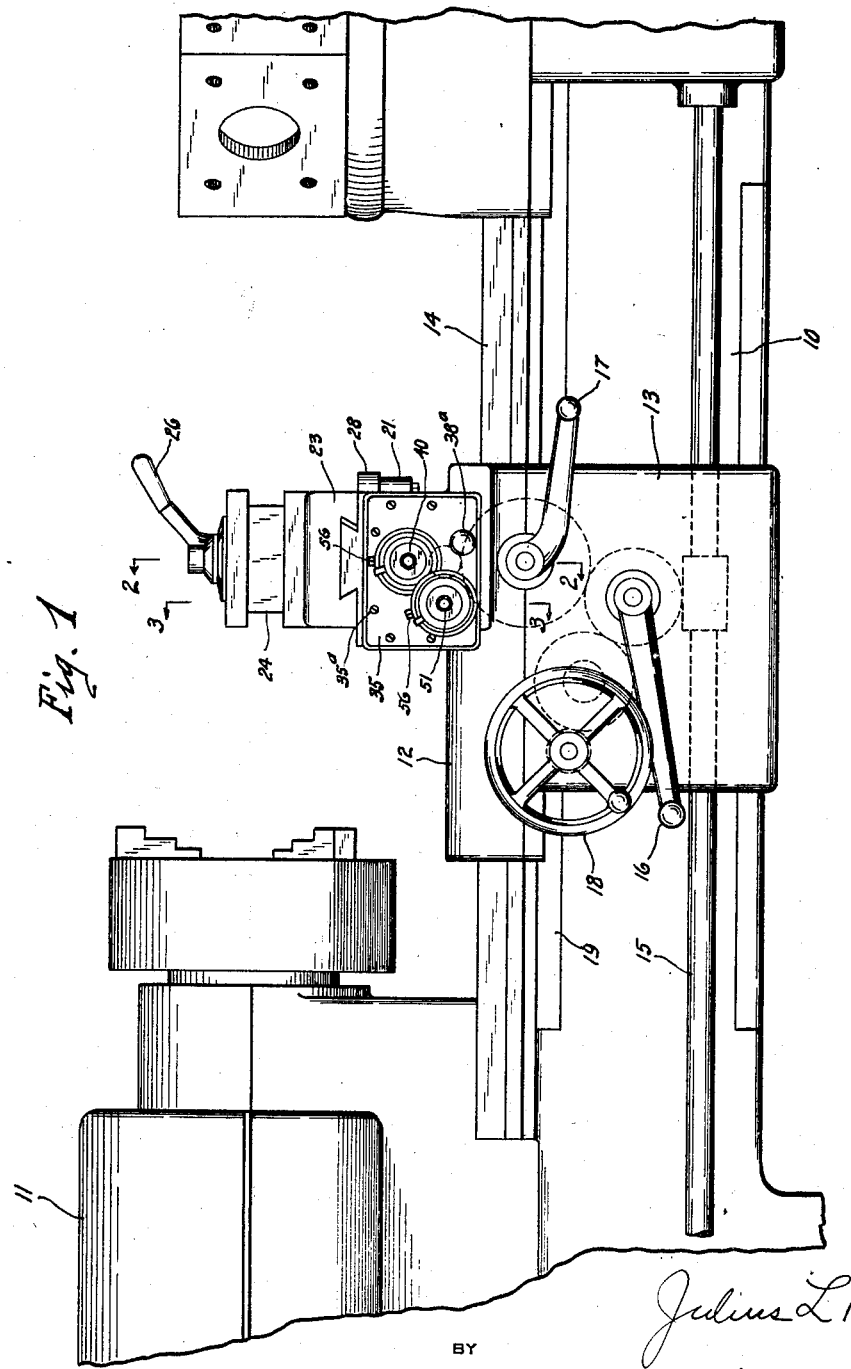

Referring now to the drawings, the machine here illustrated has a horizontal bed 10 with a head 11, which may be of usual or standard construction. The bed is customarily provided with front and rear ways on which may slide a tool supporting member, such as a turret slide. The bed is provided also with a cross-slide carriage 12 having an apron 13. The cross-slide carriage and the apron are adapted to travel along the front way 14 of the bed and also along a lower way on the front side of the bed.

The power for moving the carriage 12 along the bed and also for feeding the slides which are supported by the carriage 12 and for operating any additional slide which may be mounted on the bed, such as a turret slide, is derived from a feed shaft 15 which extends through the apron 13 and is adapted to be driven by mechanism in the head in the usual manner.

The apron 13 contains the usual apron gearing for moving the carriage 12 back and forth along the bed and for shifting the slides thereon, some of the gears being indicated by dotted lines in Fig. 1. Likewise, the apron is provided with clutches which may be operated by levers 16 and 17, one for controlling the power operated travel of the carriage along the bed, and the other for controlling the power feed of the slides. Additionally, the apron has a handwheel 18, by which the carriage may be moved along the bed manually, the bed being provided with the usual rack 19 engaged by a pinion 20 (Figs. 2 and 3), which may be rotated either by power or manually through the medium of the handwheel 18. I have not deemed it essential to show all the details of the apron for, as stated above, the apron and apron gearing are of standard construction.

Coming now to the parts more directly involved in the invention, it will be observed that the carriage 12 is provided with a cross-slide 21 which has sliding engagement with the carriage 12, being guided thereon by a dovetail projection 22 on top of the carriage engaging in a dovetail groove on the under side of the slide. On this slide is mounted the compound, universal or tool supporting slide 23 which, in this instance, is provided with a square turret 24 on which may be mounted in any suitable manner one or more tools 25. The turret is designed to be clamped onto the slide 23 through the medium of a clamping lever 26 which operates well known clamping means to either release the turret so that it may be indexed or to clamp it in position after it has been given the desired indexing movement. However, the upper slide 23 may have any other suitable tool support.

The lower side of the upper slide 23 has a dovetail groove which engages a dovetail projection 27 on a swivel member 28 which can be positioned so that the upper slide 23 may be fed at any desired angle with reference to the axis of the machine. The swivel member 28 has on its lower side a cylindrical protuberance 28$^a$ engaging in a cylindrical recess of the lower slide 21, as shown in Fig. 4, so as to admit of the swiveling of the member 28, and it is provided in this instance with a circular T-slot accommodating the heads of clamping bolts 29 which extend through side portions of the slide 21 and are adapted to tightly clamp the swivel member to the slide. After loosening nuts 30 on the lower ends of the clamping bolts 29, the member 28 may be turned or swiveled so that the feed or movement of the upper slide 23 will be in the desired direction with reference to the axis of the machine. When the nuts are tightened, the position of the swivel member is fixed on the slide 21, as will be readily understood.

Taking up now the mechanism by which the lower and upper slides 21 and 23 are actuated, it will be observed particularly by reference to Fig. 2 that there is provided in the upper part of the carriage 12 a shaft 31 having a spline extending throughout the major portion of its length and carrying a pinion 32 which is held between a pair of shoulders 12$^a$ and 12$^b$ of the carriage. This pinion is engaged by a combined gear and clutch member 33 forming a part of a clutch 34 which is an element of the standard apron mechanism. This clutch is controlled by the clutch lever 17, and when the clutch is engaged, the pinion 32 and shaft 31 may be rotated in either direction by power derived from the feed shaft 15.

It will be observed that the front part of the cross-slide 21 projects forwardly beyond and downwardly in front of the upper part of the apron 13 and that there is secured by screws 35$^a$ to the front end of the body of the cross-slide a cap 35 with an intervening plate 36. Likewise, it will be observed that the splined shaft 31 projects beyond the apron and that its forward end is journaled in the cap 35, this shaft having a shoulder 31$^a$ which is located between a portion of the plate 36 and a shoulder formed by the cap to hold the shaft 31 against endwise movement with reference to the cross-slide, in other words, to cause it to move with the cross-slide crosswise of the bed.

On this shaft 31 there is a second pinion 37 which also has a splined connection with the shaft. As the shaft moves with the cross-slide, it slides through the pinion 32 but the pinion 37 normally moves with the shaft 31 but is capable of being moved a limited distance lengthwise of the shaft. The pinion 37 is adapted to occupy three different positions which are indicated in Fig. 7, one by full lines and two by dotted lines. The pinion may be moved to any of these positions by a shifter in this instance in the form of a pull plunger 38, the inner end of the plunger having a notch or slot which engages loosely the peripheral portion of pinion 37 so that it may slide the pinion back and forth on shaft 31. The plunger is slidably mounted in the cap 35 and at its outer end it is provided with a knob or handle 38$^a$ by which it can be conveniently moved in or out. To position the pinion 37 properly, the cap is provided with a detent in the form of a spring-pressed ball 39 (see Fig. 9) which is adapted to engage in any of three notches in the plunger 38. By this expedient the pinion can be properly positioned, and at the same time the plunger is held from accidental movement from the position to which it has been moved by the operator.

In order that the cross-slide 21 may be actuated by shaft 31, the cross-slide is provided with a screw 40 which, in this instance, is located above shaft 31, the screw having a supporting bearing in the cap 35 and extending inwardly a substantial distance into the cross-slide as best shown in Fig. 2. The screw is held from endwise movement in the cross-slide and it is provided with a pinion 41 which engages the pinion 37 when the latter is in its innermost position, shown in Fig. 2, and shown in full lines in Fig. 7, so that the shaft 31 will rotate the screw 40. The latter is engaged by a nut 42 which, as shown in Figs. 2 and 8, is fastened by screws 43 to the dovetail portion 22 of the carriage 12. Thus it will be seen that when the pinion 37 is in a position to engage the pinion 41 the latter and the screw 40 are rotated, and since this screw engages the nut 42 carried by the carriage, the cross-slide and the parts supported by it are moved either forward or back crosswise of the bed, depending upon the direction of rotation of the pinion 32 and the splined shaft 31. It might be here stated that the splined shaft 31 and the screw 40 are of sufficient length to permit a very substantial crosswise movement of the cross-slide.

For the purpose of moving the upper slide 23 back and forth at any desired angle with reference to the axis of the machine, depending upon the setting of the swivel member 28, the cross-slide is provided with a shaft 44, this shaft being located in this instance at one side of the screw 40 and being supported at its front end in the cap 35 and near its rear end in the cross-slide 21. The rear end of shaft 44 is provided with a worm 45 engaging a worm wheel 46 on a short vertical shaft 47 supported at its lower end in the cross-slide 21 and its upper portion having a bearing in a bushing 48 secured in the swivel member 28 and located concentrically with respect to the axis of the rotary movement of the swivel member 28. At its upper end vertical shaft 47 has a pinion 49 engaging a rack 50 secured to the upper slide 23. Thus the rotation of shaft 44 will move the upper slide forward or backward on the swivel member 28, depending upon the direction in which this shaft is rotated.

The cap 35 supports a short shaft 51 on the inner end of which is an idler gear 52 which at all times is in mesh with a pinion 53 fixed to the forward portion of shaft 44. This gear 52 is located forwardly of the pinion 41 on screw 40 and it is so positioned that when the pinion 37 on the splined shaft 31 is moved to its forwardmost position, as indicated by dotted lines at 37ª in Fig. 7, it slides into mesh with the idler gear 52, and when it is moved to its intermediate position, indicated by dotted lines at 37ᵇ, it lies in the space between the gear 52 and pinion 41, being then clear of both gears. Therefore, when pinion 37 is positioned so as to engage pinion 41 on screw 40, the cross-slide is moved back or forward assuming that the power clutch 34 is engaged. When it is moved to its forwardmost position it engages gear 52 so as to move the upper slide back or forth on the swivel member carried by the cross-slide, and when it is in its intermediate position both slides are idle, as far as being actuated by power is concerned.

When the pinion 37 is in its intermediate position, as just stated, the slides may be moved manually and to permit this to be done the forward ends of the screw 40 and of the idler shaft 51 are squared or otherwise formed to receive levers or handwheels, whereby they may be turned manually.

It is to be noted that the members for moving the two slides manually as well as the forward end of the plunger 38 controlling the power feed are all located at the front of the cross-slide, in convenient position for manipulation by the operator while observing the cutting tool or tools and the work piece which is being machined. Likewise, it will be noted that since the manual means for actuating the slides are applied to the forward ends of separate shafts spaced apart at the front of the cross-slide, it is possible for the operator to turn the shafts either individually or simultaneously so that the slides may be moved in either direction at the same time or they may be actuated individually, as may be found desirable or convenient for the operator. This is a time saving feature in many instances when the nature of the work is such that it is desirable that the cross-slide be moved on the carriage and that the upper slide be moved on the cross-slide for loading and unloading purposes.

To facilitate the most efficient and economical use of this mechanism, the screw 40 and idler shaft 51 are preferably provided with dials 54 with suitable graduations, both being keyed or otherwise fixed to their respective shafts at the front end of the cap 35, and both are preferably provided with indicators which are adjustable on the dials, being preferably in the form of spring clips. The dials are preferably graduated at their peripheries adjacent so-called zero points 56 on the front face of the cap 35. By this means the operator can exactly control the movement of the slides and can determine by watching the dials when the point of the tool reaches a given position where it is generally desirable to throw out the power feed and complete the feeding movement manually.

It will be seen that with the construction above described, I have provided what is commonly called a compound cross-slide in the form of an attachment for the cross-slide carriage adaptable for receiving also a single slide, this attachment including the two slides and the operating mechanism therefor down to and including the splined shaft 31. When it is desired to mount a single slide, i. e., simply a cross-slide, on the carriage, this can be readily done, the slide then being operated by a screw similar to screw 40 but mounted in place of the splined shaft and being adapted to directly shift the cross-slide by a nut similar to the nut 42 but projecting down into the lower part of the notch provided in the carriage to accommodate what is now the lower part of the nut. If desired, the same nut may be used but simply reversed in position so that the part now projecting upward and threaded to receive the screw 40 will then project downward and receive the screw located where the splined shaft is located in the present construction.

Likewise, it will be seen that the drives to the two slides are direct and of simple form and that the manipulation to change the power feed from one slide to another and to move both slides manually takes place at the front of the cross-slide and that the manipulated parts for these purposes in all instances move with the cross-slide.

It should be noted that the power driven shaft 31, the screw 40, the idler shaft 51 and the shaft 44, as well as the gear shifter 38, all have bearings in the separable member of so-called cap forming the front part of the cross-slide. Not only does the cap 35 have bearings for all these shafts and for the shifter 38, but the cap and the plate 36 take the end thrust of all the shafts.

While it is not essential to my invention, in its broader aspects, that the front portion of the cross-slide be formed separately from the body or main portion of the cross-slide, this is preferably the case for by forming it separately it can be more readily machined and the bearings and thrust surfaces can be very accurately formed. It, therefore, adds to the smoothness of operation, accuracy and life of the cross-slide carriage with its slide operating mechanism and eliminates in a great measure loose play in any of the parts of the operating mechanism.

While I have shown the preferred construction, I do not desire to be confined to the precise details of construction or arrangement illustrated, but aim in my claims to cover all modifications which do not involve a departure from the spirit and scope of the invention.

Having thus described my invention, I claim:

1. A machine tool having a cross-slide carriage, a cross-slide thereon, an upper slide on the cross-slide, mechanism for actuating both slides, and power means adapted to be connected to said mechanism, the operating mechanism for the slides including means at the front of the cross-slide and carried thereby for manually operating either slide.

2. A machine tool having a cross-slide carriage, a cross-slide thereon, a second slide on the cross-slide, mechanism for actuating both slides, a power member adapted to be connected thereto, the operating mechanism having means at the front of the cross-slide by which both slides may be manually shifted, and means at the front of the cross-slide and carried thereby for controlling the power feed of the slides.

3. A machine tool having a bed, a cross-slide carriage movable thereon, a cross-slide on the carriage, a second slide on the cross-slide, operating mechanism for the slides, and a power actuated member adapted to be connected thereto, said operating mechanism including a plurality of shafts extending crosswise of the bed and movable with the cross-slide.

4. A machine tool having a cross-slide carriage, a cross-slide on the carriage, a second slide on the cross-slide, a power driven shaft and a screw adapted to be rotated thereby to actuate the cross-slide, both said shaft and the screw being moved crosswise of the bed with the cross-slide.

5. A machine tool having a cross-slide carriage, a cross-slide on the carriage, a second slide on the cross-slide, a power driven shaft and a screw adapted to be rotated thereby to actuate the cross-slide, both said shaft and said screw being moved crosswise of the bed with the cross-slide, and a nut secured to the carriage and engaging said screw.

6. A machine tool having a cross-slide carriage, a cross-slide on the carriage, a second slide on the cross-slide, a power operated shaft, a screw and a shaft both carried by the cross-slide, the former for operating the cross-slide and the latter for operating the second slide, and shiftable means whereby the power operated shaft may operate either the screw or said second-named shaft.

7. A machine tool having a cross-slide carriage, a cross-slide on the carriage, a second slide on the cross-slide, a power driven shaft, a screw, a nut carried by the carriage and engaging the screw, a second shaft operatively connected with the second slide, and shiftable means by which the power driven shaft may rotate either the screw or the second shaft, the two shafts and the screw being movable with the cross-slide.

8. A machine tool having a cross-slide carriage, a cross-slide on the carriage, a second slide on the cross-slide, a power driven shaft, a screw carried by the cross-slide, a nut carried by the carriage and engaging the screw whereby the cross-slide may be actuated, a second shaft operatively connected with the second slide and also carried by the cross-slide, and a shiftable member for transmitting power from the power driven shaft to the screw or to said second shaft, the screw and said second shaft having means at the front of the cross-slide by which both slides may be manually operated.

9. A machine tool having a cross-slide carriage, a cross-slide on the carriage, a second slide on the cross-slide, a power driven shaft, a screw carried by the cross-slide, a nut carried by the carriage and engaging the screw whereby the cross-slide may be actuated, a second shaft operatively connected to the second slide and also carried by the cross-slide, a shiftable member for transmitting power from the power driven shaft to the screw or to said second shaft, the screw and said second shaft having means at the front of the cross-slide by which both slides may be manually operated, and means at the front end of the cross-slide for controlling said shiftable member.

10. A machine tool having a cross-slide carriage, a cross-slide on the carriage, a second slide on the cross-slide, a power driven shaft movable with the cross-slide, a screw operatively connected with the cross-slide and adapted to be driven by said shaft whereby the cross-slide may be power-operated, a second shaft carried by the cross-slide and operatively connected with the second slide, and an idler shaft carried by the cross-slide and connected to the second shaft and adapted to be driven by said power driven shaft.

11. A machine tool having a cross-slide carriage, a cross-slide on the carriage, a second slide on the cross-slide, a power driven shaft movable with the cross-slide, a screw operatively connected with the cross-slide, a second shaft carried by the cross-slide and operatively connected with the second slide, and an idler shaft carried by the cross-slide and connected to the second shaft, and a shiftable member controllable from the front of the cross-slide for controlling the transmission of power from the power driven shaft to either the screw or the idler shaft.

12. A machine tool having a cross-slide carriage, a cross-slide on the carriage, a second slide on the cross-slide, a power driven shaft movable with the cross-slide, a screw operatively connected with the cross-slide and adapted to be driven by said shaft whereby the cross-slide may be power operated, a second shaft carried by the cross-slide and operatively connected with the second slide, and an idler shaft carried by the cross-slide and connected with the second shaft and adapted to be driven by said power driven shaft, the screw and the idler shaft having means at the front of the cross-slide by which both may be turned to manually manipulate the slides.

13. A machine tool having a cross-slide carriage, a cross-slide on the carriage, a second slide on the cross-slide, operating means for the slides including a power driven shaft, and two additional shafts adapted to be individually driven by the first-named shaft, one of said additional shafts being operatively connected with the cross-slide and the other being operatively connected with the second slide, all said shafts having bearings in the front portion of the cross-slide.

14. A machine tool having a cross-slide carriage, a cross-slide on the carriage, a second slide on the cross-slide, operating means for the slide including a power driven shaft, and two additional shafts adapted to be individually driven by the first-named shaft, one of said additional shafts being operatively connected with the cross-slide and the other being operatively connected with the second slide, the cross-slide having a removable portion at the front thereof with bearings for all three of said shafts.

15. A machine tool having a cross-slide carriage, a cross-slide on the carriage, a second slide on the cross-slide, and a pair of shafts, one operatively connected to the cross-slide and the other operatively connected to the second slide and serving when rotated to move the two slides, the front part of the cross-slide having a bearing for both of said shafts.

16. A machine tool having a cross-slide carriage, a cross-slide on the carriage, a second slide on the cross-slide, and a series of shafts extending in a direction crosswise of the bed, one of said shafts being operatively connected with the cross-slide to shift the same, another being operatively connected with the second slide to shift the same, the cross-slide having at the front a portion having bearings for all said shafts.

17. A machine tool having a cross-slide carriage, a cross-slide on the carriage, a second slide on the cross-slide, a series of shafts movable with the cross-slide including a power driven shaft, a screw for operating the cross-slide, an idler shaft, and a shaft driven thereby and operatively connected with the second slide, the front part of the cross-slide having bearings for and provision for taking the end thrust of all said shafts.

In testimony whereof, I hereunto affix my signature.

JULIUS L. BAYER.